(12) United States Patent
Yamamichi (10) Patent No.: US 8,856,065 B2
(45) Date of Patent: Oct. 7, 2014

(54) INFORMATION PROCESSING APPARATUS, DOCUMENT ACCESS METHOD, AND COMPUTER PROGRAM

(75) Inventor: Masaki Yamamichi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 35 days.

(21) Appl. No.: 13/593,962

(22) Filed: Aug. 24, 2012

(65) Prior Publication Data

US 2013/0054515 A1 Feb. 28, 2013

(30) Foreign Application Priority Data

Aug. 31, 2011 (JP) ................................. 2011-189556

(51) Int. Cl.
*G06F 17/30* (2006.01)
(52) U.S. Cl.
CPC ................................ *G06F 17/30165* (2013.01)
USPC ........................................................ 707/608
(58) Field of Classification Search
CPC ................................................ G06F 17/30165
USPC ........................................................ 707/608
See application file for complete search history.

(56) References Cited

U.S. PATENT DOCUMENTS

| 2003/0084087 | A1* | 5/2003 | Berry ............................ 709/102 |
| 2009/0147290 | A1* | 6/2009 | Tomita ............................ 358/1.9 |
| 2010/0235846 | A1 | 9/2010 | Yamamichi | |
| 2012/0297363 | A1* | 11/2012 | Perisic et al. .................. 717/122 |

FOREIGN PATENT DOCUMENTS

JP 2006-048536 A 2/2006

* cited by examiner

*Primary Examiner* — Huawen Peng
(74) *Attorney, Agent, or Firm* — Fitzpatrick, Cella, Harper & Scinto (57) ABSTRACT

A document management system allows a document management server to be accessed from a document management client terminal by using a database of the document management server as a backend engine, the document management system being configured to determine an appropriate access method for opening a file. In order for the document management client terminal to open a file in the document management server having an exclusive control function, the document management system accesses the document management server according to file attribute information of the file held in the document management client terminal.

6 Claims, 9 Drawing Sheets

INFORMATION PROCESSING APPARATUS, DOCUMENT ACCESS METHOD, AND COMPUTER PROGRAM

BACKGROUND OF THE INVENTION

1. Field of the Invention

The present invention relates to an information processing apparatus, a document access method, and a computer program which are used in a document management system.

2. Description of the Related Art

A document management system using a database in a document management server as a backend engine has been used mainly in an office and the like. Building of a database by storing all the files used in the office allows multiple users to perform viewing, editing, using, and the like on the files from client personal computers (PC). However, since the multiple users share and use the files as described above, an inconsistency in a file might take place due to simultaneous editing by the users. To prevent such an inconsistency, the document management server often includes a system that is capable of exclusive control. Specifically, while a file is being used by some user, the file is controlled so that any other user cannot perform update processing or the like thereon.

Generally, a method of check-out and check-in of a file is employed as an exclusive control method. The check-out operation is performed to extract a file from a database for editing the file and to set the status of the file to a check-out status (an exclusive control status) in which users other than a user ordering the check-out cannot update the file. In other words, the check-out status is a status where the file is extracted from the database and only the user ordering the check-out can edit and update the file. Thus, the file is checked out, the processing target file in the database is set to the check-out status, thereby prohibiting users other than the user ordering the check-out from updating the processing target file. Thereafter, the user ordering the check-out performs operations such as editing the checked-out file, updating the processing target file in the database, and canceling the check-out status (check-in). The check-in operation is designed to transmit the edited file to the document management server, to update the corresponding file registered in the database, and to cancel the exclusive control status so that the other users can edit the file. That is, the check-in operation updates the file in the database to the latest state, cancels the check-out status, and allows the other users to perform check-out and editing on the file.

Some of document management systems capable of such check-out-check-in processing employ a simplified operation of ordering the check-out to enable an efficient editing operation on a file. Specifically, when an "Open" operation is performed on a file, the target file in the database is automatically checked out, and then an application reads the file to make the file editable. Here, the "Open" operation is executed when the user orders an "Open" option from a menu after selecting a desired file or when the user double-clicks the desired file, for example.

In addition, many of the databases of the document management servers have a version management function. The version management function makes it possible to update the version of a file by updating the file, to refer to a file of an old version, and to check the difference between the versions.

Meanwhile, the database stores a wide variety of files. Examples of the files include a presentation material, a word processor document, and a table or graph document which are respectively created by PowerPoint (registered trademark), Word (registered trademark), and Excel (registered trademark) of Microsoft Corporation. These files are often intended to be viewed or edited by users. Further, there are various types of files which are intended to be used without being edited, such as an application execution module and a short-cut file. Use of an application execution file is to execute the corresponding application, and use of a short-cut file is to view or edit the file or web page at a reference location indicated by the short-cut file. Hence, in the opening operation on a file performed for a purpose other than editing the file, the user uses "Open" (Open as read-only) without performing the check-out (see Japanese Patent Laid-open No. 2006-48536).

However, there is no appropriate technique of determining whether or not "Open" processing performed on the file by the user is intended to edit the file. This might cause unnecessary check-out and check-in processing. Further, if the version of a file checked out but unedited is updated with updating of the file by a check-in operation following the check-out, the size of the database could be increased.

SUMMARY OF THE INVENTION

The present invention provides a document management system capable of efficiently managing documents according to purposes of users.

The present invention is an information processing apparatus for accessing a file managed by a document management server, including: a file attribute information acquisition unit configured to acquire file attribute information of a processing target file managed by the document management server; an application presence determination unit configured to determine whether or not an application associated with the processing target file is present by referring to the file attribute information; an identification unit configured to identify an access method for accessing the processing target file based on a determination result obtained by the application presence determination unit when exclusive control is executable on the file managed by the document management server; and an access unit configured to access the document management server in accordance with the access method identified by the identification unit.

When a client PC executes an operation on a file in a document management server, a method of accessing the document management server is changed based on the type of the file or on whether or not an application for editing the file is installed on the client PC. This makes it possible to efficiently manage documents according to the purpose of a user.

Further features of the present invention will become apparent from the following description of exemplary embodiments (with reference to the attached drawings).

DESCRIPTION OF THE EMBODIMENTS

Hereinbelow, an embodiment for carrying out the present invention will be described by using the drawings. Note that the following embodiment does not restrict the invention according to the scope of the claims, and the complete combination of the characteristics described in the embodiment is dispensable for the solving means of the present invention.

Here, prior to a specific embodiment, a case of "Open" executed for a purpose other than file editing will be described.

Generally, usage of a file is often limited, depending on a user who accesses a document-management server. For example, for a case where the user opens a file intended to be edited, an application that allows editing of the file to be operated is generally installed on a client PC used by the user.

In contrast, as for a file not intended to be edited, the application that allows editing of the file might not be installed on a client PC. In this case, there is a possibility that execution of an unnecessary check-out operation takes place due to execution of an opening operation on the client PC and thus prevents another user actually wishing to edit the file from editing the file. In addition, a file not intended to be edited includes an application execution module, a short-cut file, and the like. Although each file is usable on the client PC, an application intended for editing the file itself is not generally associated with the file. Hence, also in the case of opening such a file, there is a possibility that, unless the user selects "Open as read-only" for the file, an unnecessary check-out operation is executed and leads to inefficient user operation.

Hereinbelow, the embodiment will be described in view of the above points.
<Configuration>

Figure 1:
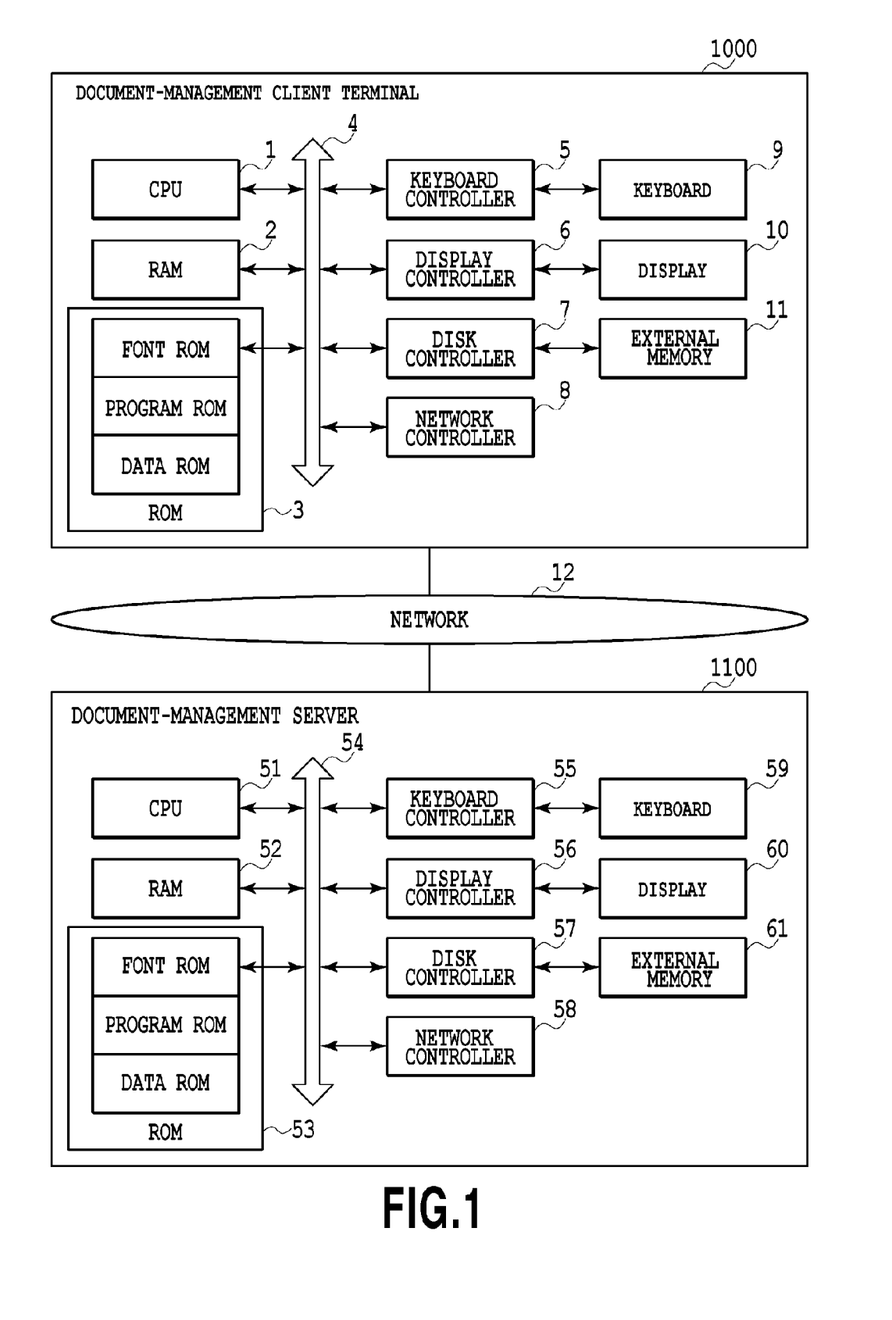
FIG. 1 is a diagram showing a hardware configuration example of a document management system according to an embodiment of the present invention.

FIG. 1 is a block diagram showing a hardware configuration example of a document management system of this embodiment. Note that a "document" is a generic term of various files managed by a document-management server 1100. For example, the "document" includes a presentation material, a document for a word processor, a document for a table or a graph, an application execution module, a short-cut file, and the like, as described above. The "document" can also include an image file, and a video file, for example.

As a document client terminal, an information processing apparatus such as a PC can be used. A document-management client terminal 1000 includes a central processing unit (CPU) 1, a random access memory (RAM) 2, a read only memory (ROM) 3, and a system bus 4. The document-management client terminal 1000 also includes a keyboard controller 5, a display controller 6, a disk controller 7, a network controller 8, a keyboard 9, a display 10, and an external memory 11. The CPU 1 controls document input and output and execution of document editing based on a document management program and the like stored in a program ROM included in the ROM 3 or the external memory 11. The CPU 1 controls devices connected to the system bus 4. The RAM 2 functions as a main memory, a work area, and the like for the CPU 1.

The ROM 3 includes the program ROM, a font ROM, and a data ROM. The program ROM in the ROM 3 or the external memory 11 stores an operating system (OS) program which is a program for controlling the CPU 1, and the like. The font ROM in the ROM 3 or the external memory 11 stores font data and the like used for document processing. Further, the data ROM in the ROM 3 or the external memory stores various data used in the document processing or the like. To the system bus 4, the CPU 1, the RAM 2, the ROM 3, the keyboard controller 5, the display controller 6, the disk controller 7, and the network controller 8 are connected.

The keyboard controller 5 controls key input from the keyboard 9 or a pointing device illustration of which is omitted. The display controller 6 controls display performed by the display 10. The disk controller 7 controls access to the external memory 11. Here, a hard disk, a floppy (registered trademark) disk, a CD-ROM or the like is used as the external memory 11. The external memory 11 stores a boot program, various applications, font data, user files, electronic files, and a printer-control-command generation program, for example. The network controller 8 executes processing of controlling communication with other information processing apparatuses including the document-management server 1100 connected to a network 12. Note that based on a command designated by a not shown mouse cursor and the like on the display 10, the CPU 1 opens any of various windows registered in advance to execute corresponding data processing.

The document-management server 1100 includes a CPU 51, a RAM 52, a ROM 53, a system bus 54, and a keyboard controller 55. The document-management server 1100 also includes a display controller 56, a disk controller 57, a network controller 58, a keyboard 59, a display 60, and an external memory 61. The details of the components are the same as those of the document-management client terminal 1000.

Figure 2:
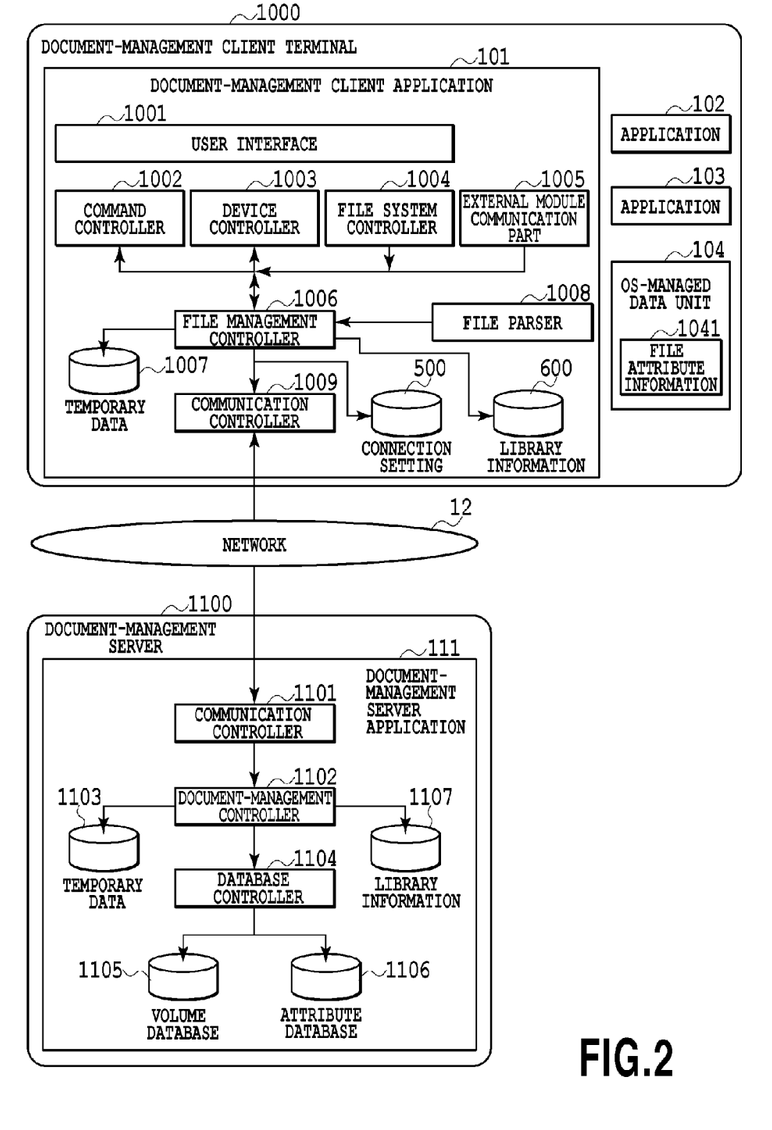
FIG. 2 is a configuration example of system blocks of the document management system according to the embodiment of the present invention.

FIG. 2 is a diagram showing system blocks of the document management system in this embodiment. The document management system in this embodiment is a client (1000)-server (1100) type application which runs on the OS of the PC. The document management system is provided for the purpose of taking files from devices, such as a scanner and a file system of the OS, and allowing the files to be managed by multiple users.
<Configuration of Document-Management Client Terminal>

The document-management client terminal 1000 includes a document-management client application 101 for file input-out and operation, an external application 102, an external application 103, and an OS-managed data unit 104. The document-management client application 101 and the external applications 102 and 103 exist as files stored in the external memory 11 shown in FIG. 1, for example. Each of these is a program module loaded into the RAM 2 by the OS or a module using the program module and then executed, and can be added to a hard disk of the external memory 11 through the floppy (registered trademark) disk or the CD-ROM of the external memory 11 or the network 12, for example. The OS-managed data unit 104 is a data area usable by the applications via the OS and means a data area or the like managed for a file or a system (for example, a registry in the case of Windows (registered trademark)). The OS-managed data unit 104 has file attribute information 1041 which includes various information provided for each file type (for example, an extension in the case of Windows (registered trademark)). The various information includes a name of a file, an (associated) application path for delivering and reading the file, and information on an Open-command input method for reading the file. An Open command is generated and executed in accordance with information on the Open-command input method, and thereby the associated application can read and activate the file. Further, the various information provided for each file type in the file attribute information 1041 includes information indicating whether or not the file is a shortcut (link) file.

A description is given of processing parts of the document-management client application 101. The document-management client application 101 is displayed on the display 10 of the document-management client terminal 1000. A user interface 1001 receives input from input devices such as the keyboard 9, an unillustrated mouse (the pointing device), and the like. Through the user interface 1001, a user registers a file in the document-management server 1100 and acquires a file from the document-management server 1100. The user also performs operations of status changing (for example, changing the status to an exclusive control status), file editing, and the like on the document-management server 1100.

A command controller 1002 parses information inputted by an operation using the user interface 1001 and performs appropriate processing. The command controller 1002 also generates a command for communication with the document-management server 1100.

A device controller 1003 controls the devices such as the scanner. Here, the device controller 1003 performs the processing of acquiring a file from any of the devices and receiving a file sent from the devices.

A file system controller 1004 is configured to perform the processing of inputting a file stored on the OS such as a file system or the like in the external memory 11. The file system controller 1004 also performs processing of exporting a file managed on the document-management server 1100 to the OS.

An external module communication part 1005 communicates with external applications to perform processing, such as delivering a file in the document-management server 1100 to any of the external applications and receiving a file from any of the external applications. For example, a file managed by the document-management server 1100 is delivered to the external application 102 or 103 to be activated, and thereby can be edited by using the external application 102 or 103.

A file management controller 1006 performs its processing in response to a file delivery from the file system controller 1004 or a communication controller 1009 or a command generated by the command controller 1002.

Temporary data 1007 is used by the document-management client application 101 and created in the process of the communication with the document-management server 1100.

A file parser 1008 identifies the type of a file that is an operation target, refers to the file attribute information 1041 in the OS-managed data unit 104, and parses the file.

The communication controller 1009 performs control for the communication with the document-management server 1100 through the network 12. The communication controller 1009 in this embodiment only performs control specific to processing between the document-management client terminal 1000 and the document-management server 1100, for example. Control of communication itself such as TCP/IP can be performed by using a controller provided in the OS.

A connection setting 500 stores settings used in connecting from the document-management client application 101 to a document-management server application 111 of the document-management server 1100. Details thereof will be described later by using FIG. 5.

Library information 600 stores capability information of libraries referred to by the document-management client application 101. The libraries represent locations where managed files exist. The details will be described later by using FIG. 6.

<Configuration of Document-Management Server>

The document-management server 1100 includes the document-management server application 111 configured to manage file databases. The document-management server application 111 exists as a program file stored in the external memory 61 shown in FIG. 1. The program file is loaded into the RAM 52 by the OS or a module using the program file and then executed.

A description is given of processing parts of the document-management server application 111. A communication controller 1101 performs control for communication with the communication controller 1009 of the document-management client terminal 1000 through the network 12, and is capable of simultaneously communicating with the communication controllers 1009 of a large numbers of the document-management client terminals 1000.

A document-management controller 1102 allocates processing to any one of the communication controller 1101 and a database controller 1104 in response to a document management processing request received by the communication controller 1101, such as a file acquisition or registration request.

Temporary data 1103 is used by the document-management server application 111.

The database controller 1104 creates data to be stored in the databases and stores appropriate files in a volume database 1105 and an attribute database 1106. The database controller 1104 also performs the processing of extracting data from a corresponding one of the databases 1105 and 1106 according to a request from the document-management client terminal 1000 and then creating a file to be delivered to the document-management client terminal 1000.

The volume database 1105 stores therein entities of files. The volume database 1105 is provided conceptually, and thus an entity of a file may be a file system in the OS.

The attribute database 1106 stores information on attributes such as a name, a creation date, comments, and an exclusive control status of a document (file).

Library information 1107 stores capability information of the document-management server 1100. The details will be described later by using FIG. 6.

Figure 3:
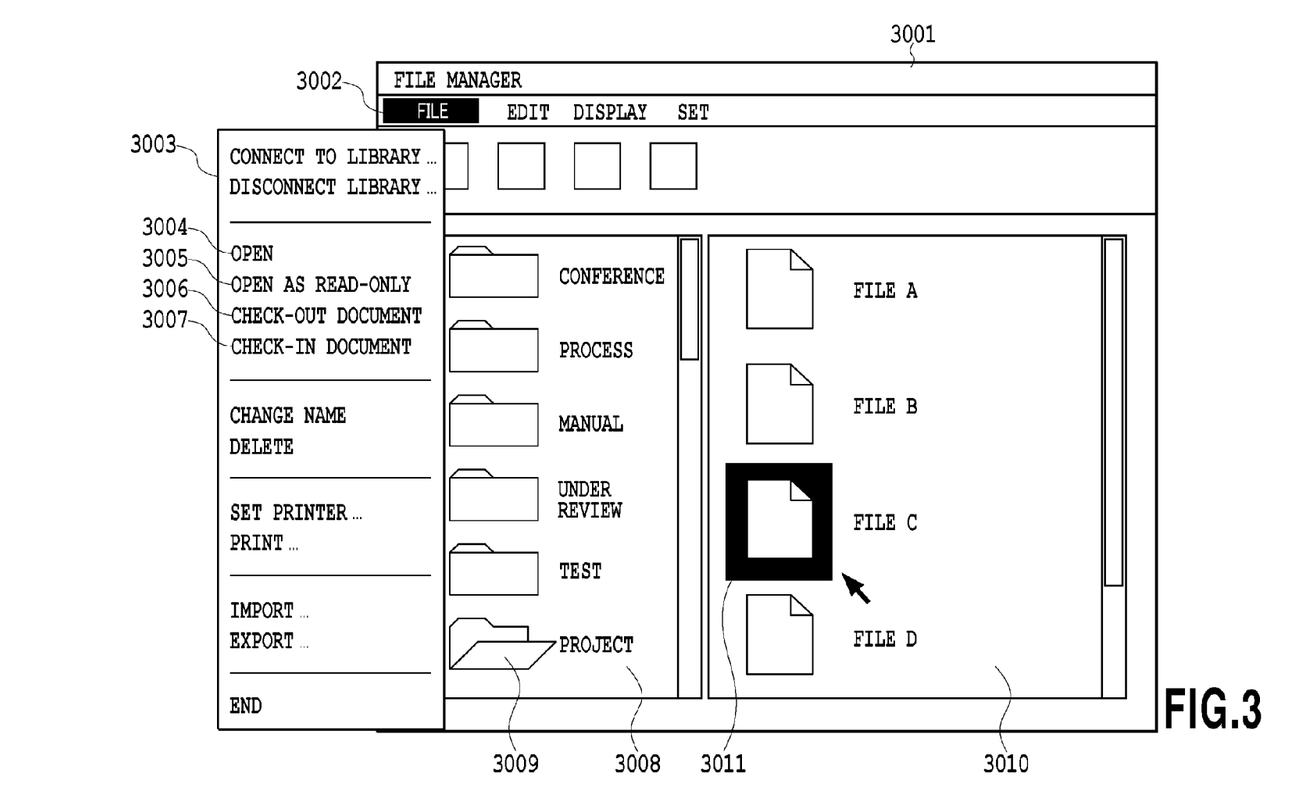
FIG. 3 is a diagram showing an example of a user interface of a main window according to the embodiment of the present invention.
Figure 4:
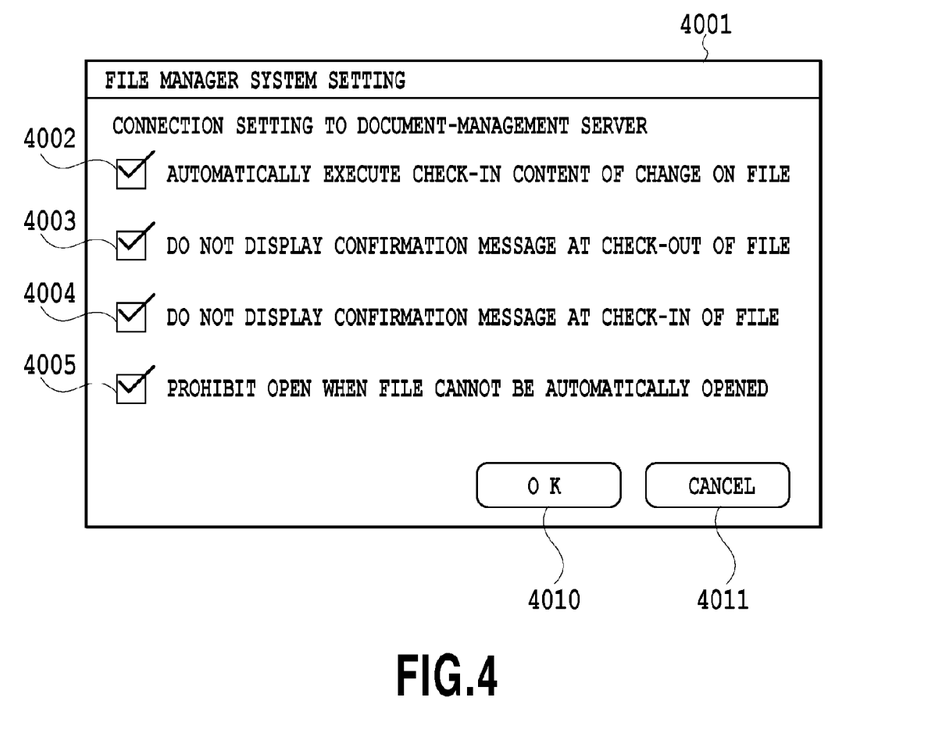
FIG. 4 is a diagram showing an example of a user interface for connection setting according to the embodiment of the present invention.

FIGS. 3 and 4 each show an example of a display shown as the user interface 1001 of the document-management client application 101. The user interface 1001 includes a main window 3001 and a connection setting dialog 4001. A menu 3002 in the main window 3001 includes menu items such as a File menu and an Edit menu. For example, when the File menu is selected from the menu items included in the menu 3002, a file menu item 3003 is displayed, which includes items 3004, 3005, 3006, 3007, and the like.

A library display region 3008 displays locations (hereinafter, referred to as libraries) where files managed by the document-management client application 101 exist. A selected library 3009 shows a library currently selected. A file display region 3010 displays a list of files existing in the selected library 3009. A selected file 3011 shows a file currently selected, and the currently selected file is a target of operations listed in the respective items 3004 to 3007. By selecting the item 3004, processing to "Open" the selected file 3011 is executed. Here, double-clicking on the selected file

3011 by the user is regarded as selecting and ordering the processing to "Open" the selected file 3011. In this embodiment, the opening processing is performed in accordance with a flowchart shown in FIG. 7 to be described later. By selecting the item 3005, processing to "Open as read-only" the selected file 3011 is executed. When the file is opened as read-only, check-out of the file is not performed. A read attribute is assigned to an acquired file, and then the file opening processing is executed. By selecting the item 3006, processing of "Check-out" the selected file 3011 is executed. By selecting the item 3007, processing of "Check-in" the selected file 3011 is executed.

The connection setting dialog 4001 is displayed, for example, by selecting a set menu item not shown in the main window 3001. Set values set by using the connection setting dialog 4001 are held as the connection setting 500 shown in FIG. 5. Checking a checkbox 4002 makes it possible to automatically execute check-in at the termination of an application which has been started after a file is delivered. A set value thereof is stored in an automatic check-in 501. Checking a checkbox 4003 makes it possible to not display a message box for selecting whether or not to actually execute check-out. A set value thereof is stored in a check-out message 502. Checking a checkbox 4004 makes it possible not to display a message box for selecting whether or not to actually execute check-in. A set value thereof is stored in a check-in message 503. Checking a checkbox 4005 makes it possible to display, when the "Open" processing is ordered, a message box indicating prohibition of execution of the "Open" processing for a file which is not provided with an Open command, and thus to prevent execution of the "Open" processing. A set value thereof is stored in Open-command-absence-based opening prohibition 504.

Figure 5:
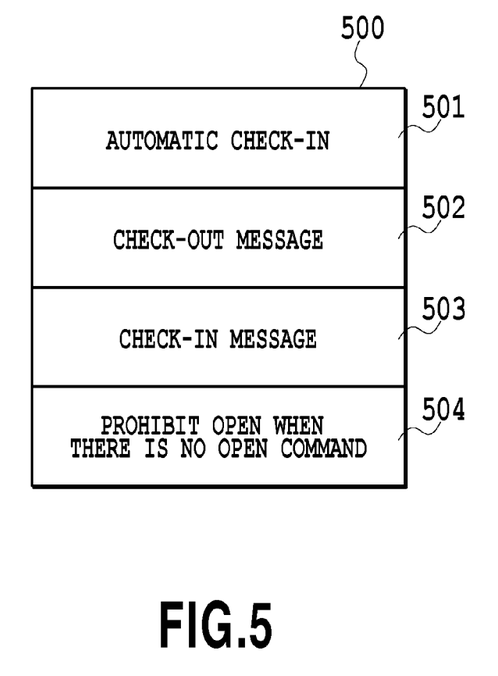
FIG. 5 is a diagram showing an example of connection setting data according to the embodiment of the present invention.

Here, the connection setting 500 is held in the external memory 11 as a setting file for the document-management client application 101. When being referred to, the connection setting 500 is loaded into the RAM 2. The settings may be determined by the user in advance.

Figure 6:
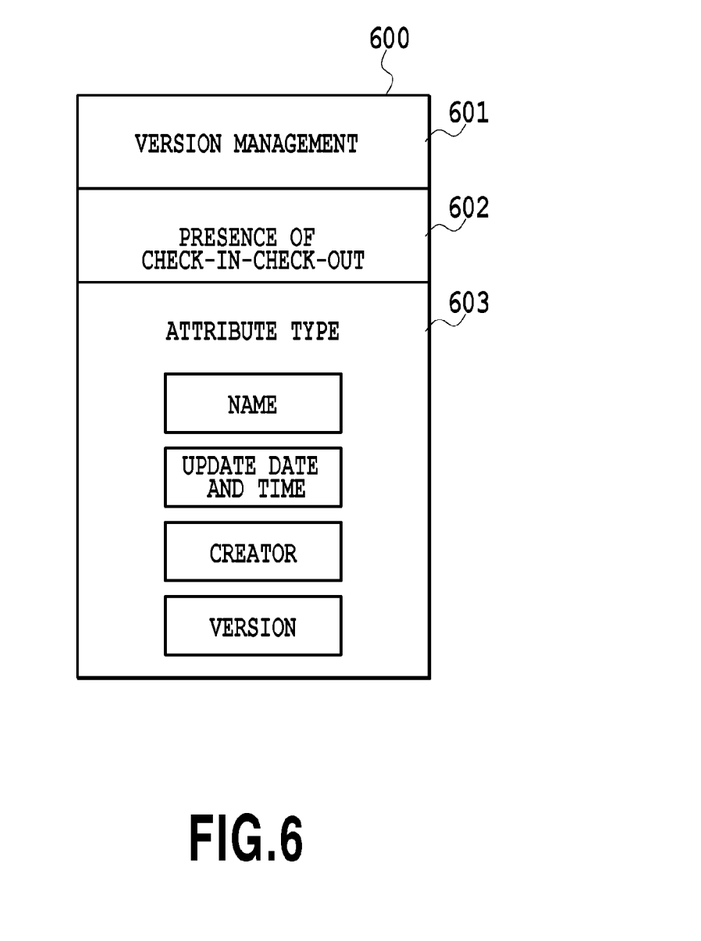
FIG. 6 is a diagram showing an example of library information data according to the embodiment of the present invention.

FIG. 6 shows an example of capability information of a library. The library information 600 is information of a currently accessed library. The information may be set at the timing of accessing the library after information of all the libraries managed by the document-management client application 101 is acquired at the timing of starting the document-management client application 101. Alternatively, the information may be acquired at the timing of connecting the currently selected library. Note that the library information 1107 has the same configuration as that of the library information 600 and stores capability information of libraries of the document-management server 1100.

Version management information 601 stores information indicating whether or not a target library is provided with a file version management function. Check-in-check-out presence information 602 stores information indicating whether or not the target library is provided with a check-in-check-out function for exclusive control of a file. An attribute type 603 stores attribute information of files existing in the target library. For example, the attribute information includes a name, an update date and time, a creator, a file version, and the like. It should be noted that the attribute information, of the files existing in the target library, included in the attribute type 603 is different from the file attribute information 1041 of the OS-managed data unit 104.

Here, the library information 600 is loaded into the RAM 2 when being acquired or referred to, while the library information 1107 is loaded into the RAM 52 when being acquired or referred to.

<Operations in Executing Opening Operation on File>

Figure 7:
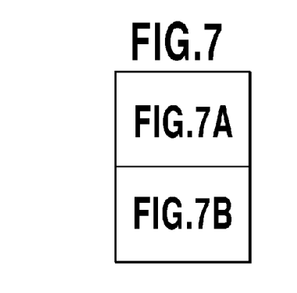
FIG. 7 is a diagram showing the relationship of FIGS. 7A and 7B.
Figure 7A:
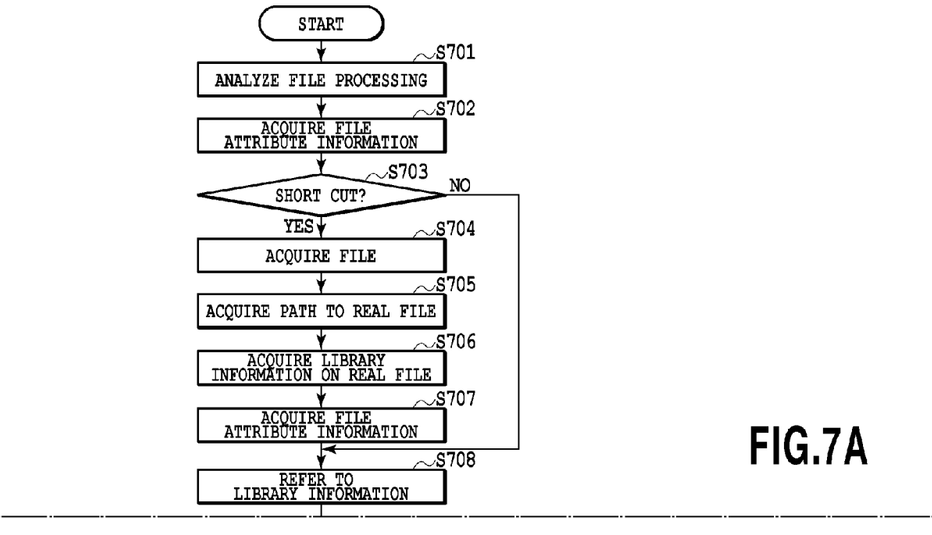
FIGS. 7A and 7B are flowcharts for executing a file opening operation according to the embodiment of the present invention.
Figure 7B:
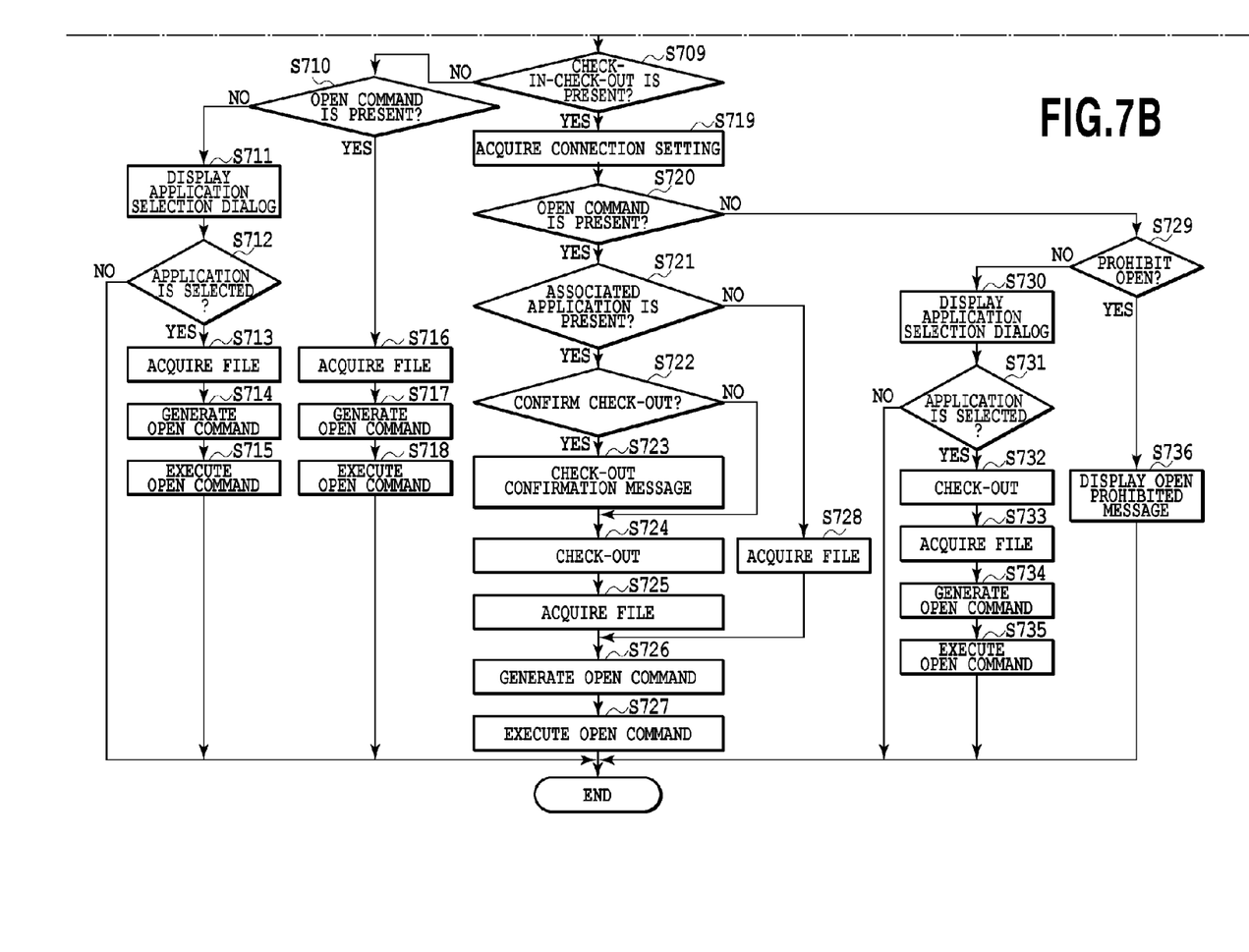

FIG. 7 is a flowchart showing an example of processing flow of a document access method used when an "Open" operation is executed on a file.

When the item 3004 is selected in the main window 3001 of the user interface 1001 of the document-management client application 101, the document-management client application 101 starts an "Open" processing flow. Alternatively, the processing may be started by double-clicking the file instead of selecting the item 3004.

In Step S701, the command controller 1002 parses the details of user operation and notifies the file management controller 1006 of the file name of a processing target and execution of the opening operation, and the file management controller 1006 delivers the file name to the file parser 1008. In Step S702, the file parser 1008 acquires file attribute information of the processing target file from the file attribute information 1041 of the OS-managed data unit 104 based on the delivered file name. In Step S703, the file management controller 1006 refers to the file attribute information acquired in Step S702 to determine whether or not to include a definition as a short-cut file (short-cut-file determination processing). If the file is defined as a short-cut file, the file management controller 1006 determines that the file is a short-cut file. In the case of a short-cut file, the processing proceeds to Step S704. In the case of not a short-cut file, the processing proceeds to Step S708.

In Step S704, the file management controller 1006 acquires the processing target file from the document-management server 1100 through the communication controller 1009. Specifically, the communication controller 1009 instructs the communication controller 1101 of the document-management server application 111 through the network 12 to acquire the processing target file. The communication controller 1101 having received the instruction for acquiring the file transfers the received instruction to the document-management controller 1102. The document-management controller 1102 acquires the processing target file in the volume database 1105 through the database controller 1104, and transmits the file to the communication controller 1009. Subsequently, in Step S705, the file management controller 1006 instructs the file parser 1008 to parse the short-cut file acquired in Step S704, and acquires a path to a reference location of the short-cut file (reference-destination acquisition processing), from the parsing result. In Step S706, the file management controller 1006 acquires, through the communication controller 1009, the library information 1107 of a library having the path to the reference location of the short-cut file. Specifically, the communication controller 1009 instructs, through the network 12, the communication controller 1101 of the document-management server application 111 to acquire library information 1107. The communication controller 1101 having received the instruction for acquiring the library information 1107 transfers the received instruction to the document-management controller 1102. The document-management controller 1102 acquires the library information 1107 and transmits the library information 1107 to the communication controller 1009 through the communication controller 1101. In Step S707, the file parser 1008 acquires file attribute information of a processing target file (a file indicated by the path to the reference location of the short-cut file) from the file attribute information 1041 of the OS-managed data unit 104 based on the delivered file path. The file at the reference location obtained in the file attribute information acquisition processing is set as a processing target file (file setting processing). Processing after Step S708 is performed by using the set file, that is, the file at the reference location.

In Step S708, the file management controller 1006 refers to the library information 600 of the library including the file currently set as the processing target. In Step S709, the file management controller 1006 refers to the check-in-check-out presence information 602. If the library is provided with the check-in-check-out function, the processing proceeds to Step S719. If the library is not provided with the check-in-check-out function, the processing proceeds to Step S710.

Next, a description is given of processing to be performed when the check-in-check-out function is absent. In Step S710, the file management controller 1006 refers to the file attribute information of the processing target file acquired in Step S702 or S707 to determine whether or not an Open command (command determination processing) is present for the processing target file. If the determination result is that the Open command is present, the processing proceeds to Step S716. If the Open command is absent, the processing proceeds to Step S711.

If the Open command is absent, in Step S711 the file management controller 1006 displays such a dialog (not shown) that prompts the user to select an application for opening the file through the user interface 1001. In Step S712, the command controller 1002 notifies the file management controller 1006 of a determination result of whether or not the user selects an application. If the user selects an application, the processing proceeds to Step S713. If the user does not select an application, the file management controller 1006 terminates the processing. If the user selects the application, in Step S713 the file management controller 1006 acquires the file which is an operation target through the communication controller 1009 in the same manner as in Step S704. That is, the file management controller 1006 acquires the operation target file from the document-management server 1100 through the communication controller 1009. In Step S714, the file management controller 1006 generates an Open command by using the application selected through the external module communication part 1005, subsequently executes the Open command in Step S715, and then terminates the processing.

On the other hand, if the Open command is present, in Step S716 the file management controller 1006 acquires the operation target file from the document-management server 1100 through the communication controller 1009 in the same manner as in Step S704. In Step S717, the file management controller 1006 refers to the file attribute information 1041 of the operation target file through the external module communication part 1005, generates an Open command, subsequently executes the Open command in Step S718, and then terminates the processing.

Next, a description is given of processing to be performed when the check-in-check-out function is present. In Step S719, the file management controller 1006 acquires and reads the connection setting 500. In Step S720, the file management controller 1006 refers to the file attribute information of the processing target file and determines whether or not an Open command is present for the processing target file. If the Open command is present, the processing proceeds to Step S721. If the Open command is absent, the processing proceeds to Step S729.

If the Open command is present, in Step S721 the file management controller 1006 refers to the file attribute information 1041 of the processing target file and determines whether or not an application associated with the processing target file is present. If the result of this application presence determination step is that the application is present, the processing proceeds to Step S722. If the application is absent, the processing proceeds to Step S728.

If the application associated with the processing target file is present, in Step S722 the file management controller 1006 refers to the check-out message 502 in the connection setting 500 and determines whether or not to display a check-out confirmation message. If the file management controller 1006 determines that the check-out confirmation message is to be displayed, the processing proceeds to Step S723. If the file management controller 1006 determines that the check-out confirmation message is not to be displayed, the processing proceeds to Step S724. In Step S723, the file management controller 1006 displays the message box for the check-out confirmation. When the user clicks an OK button, the processing proceeds to Step S724. Here, when the message box (not shown) is provided with a Cancel button, this step may be configured such that when the user clicks the Cancel button, the processing is terminated in this step.

In Step S724, the file management controller 1006 gives an instruction for changing the status of the processing target file to the check-out status, through the communication controller 1009. Specifically, the communication controller 1009 instructs the communication controller 1101 of the document-management server application 111 to perform the check-out of the processing target file, through the network 12. The communication controller 1101 having received the file check-out instruction transfers the received instruction to the document-management controller 1102, and the document-management controller 1102 changes a non-exclusive control status of the file in the attribute database 1106 to the exclusive control status through the database controller 1104. In Step S725, the file management controller 1006 acquires the operation target file from the document-management server 1100 through the communication controller 1009 in the same manner as in Step S704. In Step S726, the file management controller 1006 refers to the file attribute information 1041 of the processing target file through the external module communication part 1005, generates an Open command, subsequently executes the Open command in Step S727, and then terminates the processing. In Step S728, the file management controller 1006 acquires the operation target file from the document-management server 1100 through the communication controller 1009 in the same manner as in Step S704.

As described above, in cases where the check-in-check-out function is present, where the Open command is present, and where the application associated with the processing target file is absent, the check-out is not performed. This can prevent execution of unnecessary check-out.

If the Open command is absent, in Step S729 the file management controller 1006 refers to the Open-command-absence-based opening prohibition 504 in the connection setting 500. If the reference result is that "Open" is prohibited, the processing proceeds to Step S736. If "Open" is not prohibited, the processing proceeds to Step S730. Here, if the Open command is absent, processing is determined according to the set value of the opening prohibition 504 in Step S729 in this processing flow, but the opening may be immediately aborted without referring to the set value, so that the processing is terminated.

If "Open" is not prohibited, in Step S730 the file management controller 1006 displays such a dialog (not shown) that prompts the user to select an application for opening the file through the user interface 1001. In Step S731, the command controller 1002 notifies the file management controller 1006 of a determination result of whether or not the user selects an application. If the user selects an application, the processing proceeds to Step S732. If the user does not select an application, the file management controller 1006 terminates the processing. In Step S732, the file management controller 1006 gives an instruction for changing the status of the processing target file to the check-out status, through the communication controller 1009 in the same manner as in Step S724. In Step S733, the file management controller 1006 acquires the processing target file from the document-management server 1100 through the communication controller 1009 in the same manner as in Step S704. In Step S734, the file management controller 1006 generates an Open command by using the application selected through the external module communication part 1005, subsequently executes the Open command in Step S735, and then terminates the processing.

Figure 8:
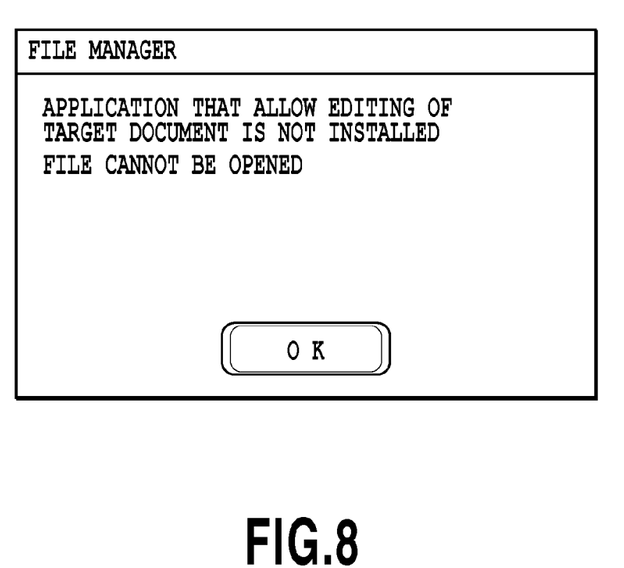
FIG. 8 is a diagram showing an example of a user interface notifying the user that file opening is prohibited.

On the other hand, if "Open" is prohibited, in Step S736 the file management controller 1006 displays a message box as shown in FIG. 8 which notifies the user that the file cannot be opened, through the user interface 1001. When the user clicks an OK button, the processing is terminated.

Note that when the check-out has been executed in the aforementioned processing flow, the check-in is executed by subsequent user operation. For example, when the automatic check-in 501 in the connection setting 500 is configured to execute the automatic check-in, the check-in is executed when the application executed according to the Open command is terminated. To execute the check-in processing, the file management controller 1006 gives an instruction for the check-in of the processing target file through the communication controller 1009. Specifically, the communication controller 1009 instructs the communication controller 1101 of the document-management server application 111 to perform the check-in of the processing target file, through the network 12. The communication controller 1101 having received the file check-in instruction transfers the received instruction to the document-management controller 1102, and the document-management controller 1102 changes the exclusive control status of the file in the attribute database 1106 to the non-exclusive control status through the database controller 1104. The document-management controller 1102 also updates the check-in target file in the volume database 1105. It goes without saying that the check-in is also executable when the user selects the document check-in item 3007 at any timing.

As described above, the document management system using databases of the document management server as a backend engine identifies an optimum server access method for a file according to the file attribute information in the document management client PC. As a result, the user can work with an efficient opening operation that is the same all the time without caring about the file type. Specifically, when file editing is required, the check-out can be automatically performed. On the other hand, when file editing is not required, unnecessary check-out can be avoided. This prevents an increase in the size of the database which would occur if the version of a file checked out but unedited were updated upon update of the file by a check-in operation following the check-out. Further, in the case where the target file is a short-cut file, a file at a reference location indicated by the short-cut file is processed. As a result, the short-cut file can also be accessed efficiently.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-189556, filed Aug. 31, 2011, which is hereby incorporated by reference herein in its entirety.

What is claimed is:

1. An information processing apparatus for accessing a file managed by a document management server, comprising:
    a file attribute information acquisition unit configured to acquire file attribute information of a processing target file managed by the document management server when a predetermined operation is ordered for the processing target file by a user;
    an application presence determination unit configured to determine, based on the file attribute information acquired by the file attribute information acquisition unit when the predetermined operation is ordered for the processing target file by the user, whether or not an application associated with the processing target file is present in the information processing apparatus;
    a first acquisition unit configured to change a status of the processing target file to a check-out status and acquire the processing target file from the document management server in the event the application presence determination unit determines that the application associated with the processing target file is present in the information processing apparatus when the predetermined operation is ordered for the processing target file by the user; and
    a second acquisition unit configured to acquire the processing target file from the document management server without changing the status of the processing target file to a check-out status in the event the application presence determination unit determines that the application associated with the processing target file is absent in the information processing apparatus when the predetermined operation is ordered for the processing target file by the user.

2. The information processing apparatus according to claim 1, further comprising a command determination unit configured to determine, based on the file attribute information, whether or not a command for opening the processing target file is present, wherein in the event the command determination unit determines that the command for opening the processing target file is present, the application presence determination unit determines whether or not an application associated with the processing target file is present.

3. The information processing apparatus according to claim 2, further comprising:
    a prohibition determination unit configured to determine whether an opening of the processing target file is prohibited when the command determination unit determines that the command for opening the processing target file is absent; and a notification unit configured to notify a user that the opening of the processing target file is prohibited when the prohibition determination unit determines that the opening of the processing target file is prohibited.

4. The information processing apparatus according to claim 1, further comprising:
   a short-cut file determination unit configured to determine whether or not the processing target file is a short-cut file by referring to the file attribute information;
   a reference location acquisition unit configured to acquire a reference location of the short-cut file when the short-cut-file determination unit determines that the processing target file is the short-cut file; and
   a file setting unit configured to set, as the processing target file, a file at the reference location acquired by the reference location acquisition unit.

5. A document access method to be executed by an information processing apparatus for accessing a file managed by a document management server, the document access method comprising:
   a file attribute information acquisition step of acquiring file attribute information of a processing target file managed by the document management server when a predetermined operation is ordered for the processing target file by a user;
   an application presence determination step of determining, based on the file attribute information acquired in the file attribute information acquisition step when the predetermined operation is ordered for the processing target file by the user, whether or not an application associated with the processing target file is present in the information processing apparatus;
   a first acquisition step of changing a status of the processing target file to a check-out status and acquiring the processing target file from the document management server in the event the application presence determination step determines that the application associated with the processing target file is present in the information processing apparatus when the predetermined operation is ordered for the processing target file by the user; and
   a second acquisition step of acquiring the processing target file from the document management server without changing the status of the processing target file to a check-out status in the event the application presence determination step determines that the application associated with the processing target file is absent in the information processing apparatus when the predetermined operation is ordered for the processing target file by the user.

6. A non-transitory computer-readable storage medium storing a program that when executed causes a computer to perform a document access method comprising:
   a file attribute information acquisition step of acquiring file attribute information of a processing target file managed by the document management server when a predetermined operation is ordered for the processing target file by a user;
   an application presence determination step of determining, based on the file attribute information acquired in the file attribute information acquisition step when the predetermined operation is ordered for the processing target file by the user, whether or not an application associated with the processing target file is present in the computer;
   a first acquisition step of changing a status of the processing target file to a check-out status and acquiring the processing target file from the document management server in the event the application presence determination step determines that the application associated with the processing target file is present in the computer when the predetermined operation is ordered for the processing target file by the user; and
   a second acquisition step of acquiring the processing target file from the document management server without changing the status of the processing target file to a check-out status in the event the application presence determination step determines that the application associated with the processing target file is absent in the computer when the predetermined operation is ordered for the processing target file by the user.

* * * * *